United States Patent

[11] 3,619,367

| [72] | Inventor | Andre Gumuchian<br>Paris, France |
|---|---|---|
| [21] | Appl. No. | 731,468 |
| [22] | Filed | May 23, 1968 |
| [45] | Patented | Nov. 9, 1971 |
| [73] | Assignee | Commissariat A L'Energie Atomique<br>Paris, France |
| [32] | Priority | June 6, 1967 |
| [33] | | France |
| [31] | | 109,346 |

[54] FUEL ASSEMBLY WITH SOLID END-FITTING
1 Claim, 2 Drawing Figs.

[52] U.S. Cl. .................................................. 176/78,
176/30, 176/79, 176/87
[51] Int. Cl. ..................................................... G21c 19/10
[50] Field of Search ............................................ 176/78, 76,
68, 79, 87, 30

[56] References Cited
UNITED STATES PATENTS

| 3,163,585 | 12/1964 | Metcalfe et al. ............... | 176/87 |
| 3,169,097 | 2/1965 | Meyers .......................... | 176/79 |
| 3,238,105 | 3/1966 | McNelly ........................ | 176/68 X |
| 3,340,154 | 9/1967 | Sinclair et al. ................ | 176/87 X |
| 3,367,840 | 2/1968 | MacPhee ....................... | 176/78 |
| 3,425,905 | 2/1969 | Greenhalgh et al. ........... | 176/78 X |
| 3,432,388 | 3/1967 | Fortescue ...................... | 176/68 X |
| 3,235,465 | 2/1966 | McDaniel et al. .............. | 176/64 X |

Primary Examiner—Carl D. Quarforth
Assistant Examiner—Gary G. Solyst
Attorney—Cameron, Kerkam & Sutton ABSTRACT: The end-fitting of a fuel assembly is constituted by a solid cylinder which is intended to be placed within a stationary cylindrical support tube of a nuclear reactor diagrid, the support tube being provided with openings for the admission of a cooling fluid. The lower extremity of the end-fitting is provided with a recess for the engagement of a member which locks the end-fitting in the support tube. The upper extremity of the end-fitting is attached to a connecting element which is joined to a fuel assembly box containing the fuel pins. The connecting element is pierced by openings so that the cooling fluid which is admitted into the space formed between the support tube and the end-fitting can circulate between said space and the interior of the fuel assembly box.

FUEL ASSEMBLY WITH SOLID END-FITTING

This invention relates to fuel assemblies for nuclear reactors which are cooled by circulation of a heat-transporting fluid such as, for example, a liquid metal.

In this type of application, a fuel assembly of known design usually comprises a hollow end-fitting constituted by a tubular portion having an upward extension or connecting member for joining said end-fitting to the fuel assembly box, said box being designed to contain one or a number of bundles of pins of fissile or fertile material.

The end fitting of each of the fuel assemblies which constitute the core of a reactor is inserted in an orifice of a diagrid through which the coolant is admitted into the fuel assemblies. The diagrid is usually made up of plates braced by cylindrical support tubes which are each adapted to accommodate the end fitting of one fuel assembly.

In known reactors which are provided with an arrangement of this type, the coolant is supplied to the fuel assemblies along two alternative routes, depending on the design:

either axially, in which case the fluid is admitted at the lower part of the reactor diagrid and flows upwards through this latter inside the tubular end fitting of the fuel assembly, or laterally, in which case the fluid is admitted between the plates of the diagrid, flows upwards within the tubular end fitting after having passed successively through the wall of the diagrid support tube and through the wall of the end fitting, both the support tube and the end fitting being provided with apertures which must be in register.

The assembly end fittings and the diagrid support tubes are fitted with restraining means referred-to as "latches" in order to permit the positioning of a fuel assembly only in the location for which it is specifically intended. Said restraining means are usually constituted by the judicious combination of successive variations of the external diameter of the end fitting and of the internal diameter of the diagrid support tube. Should it prove necessary to make provision for a large number of mutual restraints, this arrangement results in an appreciable increase in thickness both of the tubular end fitting and of the diagrid support tube.

Moreover, in the case of lateral supply of coolant to the fuel assemblies, the necessary presence of apertures in the end fitting and in the support tube which accommodates this latter has a disadvantage in that it entails:

on the one hand the exact correspondence of said apertures in the end fitting and in the support tube, on the other hand a predetermined number of said apertures.

By way of example, in the case of fuel assemblies disposed on a triangular lattice above the diagrid, it is necessary for reasons of symmetry to form six apertures in register both on each end fitting and on each support tube.

The primary aim of the invention is to circumvent the above-mentioned disadvantages which are attached to known fuel assemblies or to the use of such assemblies. Furthermore, the invention permits of simplification of profiles, economy of construction and the possibility of standardization of the configuration of fuel-assembly end fittings.

With this object in view, the invention is concerned with a fuel assembly for a nuclear reactor which is cooled by circulation of a heat-transporting fluid. Said assembly comprising a box containing one or a number of bundles of pins of fissile or fertile material and constituting a duct through which is circulated a fluid for cooling the reactor core and an end fitting forming an extension of said box and adapted to bear on a stationary cylindrical support tube of the reactor diagrid, said support tube being joined to the other diagrid tubes by means of rigid braces and pierced by lateral openings for the admission of said cooling fluid, is characterized in that said fuel assembly comprises a solid end fitting of generally cylindrical shape, a recess for a restraining latch which is formed at the lower extremity of said end fitting, an element for connecting said end fitting to the fuel assembly box and at least one passageway for the circulation of cooling fluid which is formed right through said connecting element and opens at one end near the periphery of the end fitting and at the other end in the interior of said fuel assembly box.

According to another feature of the invention, the end fitting is provided at the upper extremity with a cylindrical head on which the connecting element is fixed by means of a transverse dowel-pin.

The connecting element and the tubular box are advantageously assembled by means of an annular welded joint.

In order to provide a substantially leak-tight bearing, the base of the connecting element which couples the solid end fitting to the annular box of the fuel assembly as well as the upper extremity of the diagrid support tube are advantageously provided with corresponding annular bearing surfaces.

The lower extremities of the end fitting and the support tube are preferably provided with guide surfaces which are applied in substantially leak-tight contact.

The invention also extends to the features described hereinafter and to the various possible combinations thereof.

Two forms of construction of the fuel assembly in accordance with the invention are shown by way of nonlimitative example in the accompanying drawings, in which.

Figure 1:
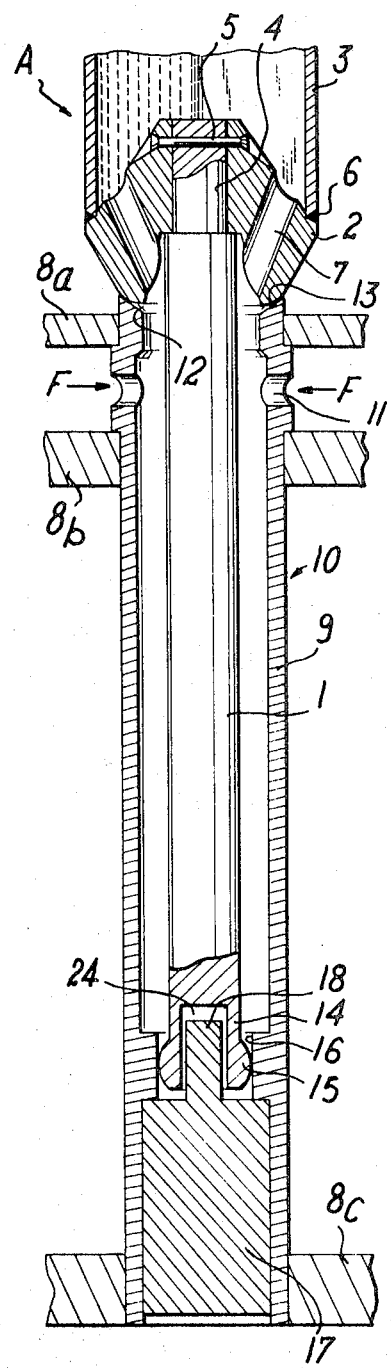
FIG. 1 is a partial front sectional view of a fuel assembly in accordance with the invention, said assembly being shown as bearing on a diagrid support tube through which is established a flow of coolant at low pressure.

The fuel assembly A which is illustrated in FIG. 1 comprises a solid end fitting 1 of generally cylindrical shape, a connecting element 2 and a box 3 which contains one or a plurality of fuel pins (which are not shown in the drawings).

The solid end fitting is provided at the upper end thereof with a head 4 of cylindrical shape which constitutes a bearing member for the connecting element 2, said element being fixed on said head by means of a transverse dowel-pin 5.

The connecting element 2 is rigidly fixed to the fuel assembly box 3 by means of an annular weld fillet 6 and is provided with a plurality of passageways 7 so as to permit the admission of the coolant into the fuel assembly box 3.

In the example shown in FIG. 1, the coolant is at low-pressure and is admitted in the vicinity of the assembly end-fitting between two of the plates 8, namely the plates 8a and 8b, which form together with the support tubes 9 a diagrid 10 for supporting all the fuel assemblies which constitute a nuclear reactor core.

In the diagrid 10 which is shown in FIG. 1, the coolant is admitted into each support tube 9 through apertures 11 formed in this latter at a level which is located between the upper plates 8a-8b of the diagrid 10, the coolant being admitted between said two upper diagrid plates (as indicated in the figure by the arrows F).

The upper extremity of each support tube 9 and the lower extremity of the connecting element of the fuel assembly which is received in said support tube are provided with corresponding bearing surfaces 12-13 which make it possible to provide a practically leak-tight connection.

The end-fitting 1 is provided at the lower extremity 14 with a guiding device which permits the alignment of said end-fitting within the support tube 9 of the diagrid 10. In this example, said guiding device comprises a spherical bearing 15 which is applied in substantially leak-tight manner against an annular shoulder 16 formed in the internal wall of the support tube 9.

Below said annular shoulder 16, there is fixed on said support tube 9 a nut 17 having a cylindrical head 18 which constitutes a latch and is adapted to engage in a recess of the extremity 14 of the end fitting 1 of the fuel assembly A.

Figure 2:
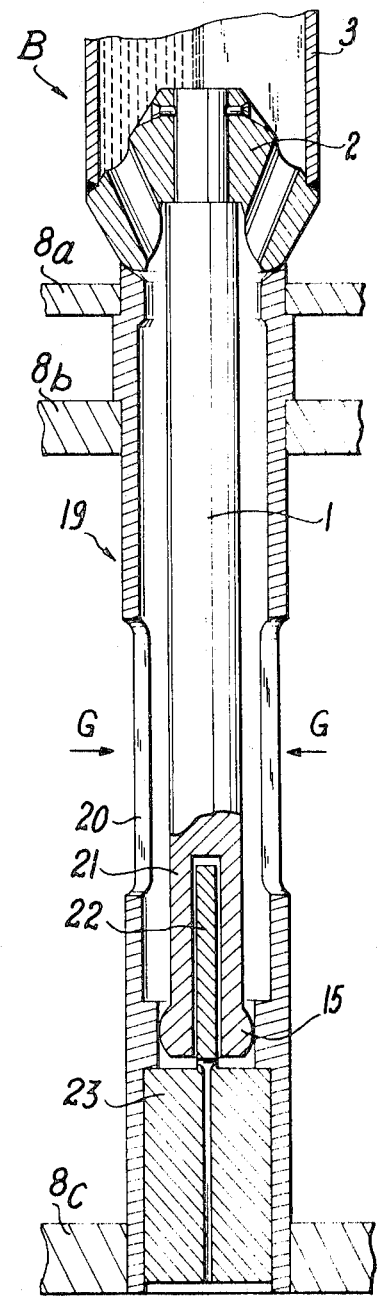
FIG. 2 is a partial front sectional view of another fuel assembly in accordance with the invention, said assembly being shown as bearing on a diagrid support tube through which is established a flow of coolant at high-pressure.

The fuel assembly B which is illustrated in FIG. 2 as a second embodiment of the invention as well as the support tube 19 on which said fuel assembly is carried differ only very slightly from the assembly A and support tube 9 which are shown in FIG. 1. The same reference numerals have therefore been employed to designate identical components of the assemblies and support tubes which are illustrated in FIGS. 1 and 2.

The support tube 19 of FIG. 2 is adapted for a circulation of coolant at high-pressure and is accordingly provided with openings 20 of large cross-sectional area which are located between the lower plates 8b and 8c of the diagrid.

At the lower extremity of said support tube 19, there is fixed a nut 23 having a cylindrical head 22 of substantial length which is adapted to engage in a recess formed in the extremity 21 of the end fitting of the fuel assembly B.

The fuel assemblies according to the invention permit the standardization of the assembly end fittings for either low-pressure or high-pressure coolant, dispense with any need to locate the coolant admission openings in register and considerably extend the scope allowed for the positioning of restraining latches.

As will be clearly understood, the invention is not limited to the examples of construction which have been described with reference to the accompanying drawings.

If necessary, recourse could be had to other methods or forms of construction without thereby departing from the purview of this invention.

What we claim is:

1. A nuclear reactor fuel assembly for a nuclear reactor having a diagrid, a plurality of support tubes connected and supported by the diagrid, lateral openings in said tubes for the passage of a fluid cooling the reactor, a box secured to each of said tubes containing pins of fissile or fertile material forming a duct for the circulation of the cooling fluid, a solid end fitting secured to said box extending into said tube, a recess in the lower end axis of said end fitting receiving a latch at the bottom of said tube for securing the same, radially projecting guide surfaces at the lower end of said end fitting in substantially leak-tight engagement with said support tube, an annular connecting element between said box and said end fitting seated on the upper end of said tube by annular bearing surfaces on said connecting element and on said tube forming a fluidtight seal therebetween and passageways in said connecting element for the cooling fluid opening into said tube adjacent said surfaces and opening into said box.

* * * * *